(12) United States Patent
Ushiyama

(10) Patent No.: US 8,335,849 B2
(45) Date of Patent: Dec. 18, 2012

(54) COMMUNICATION SYSTEM, TERMINAL APPARATUS, RECORDING MEDIUM WHICH RECORDS PROGRAM OF TERMINAL APPARATUS AND CONTENT INFORMATION ACQUIRING METHOD

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 154 days.

(21) Appl. No.: 12/585,663

(22) Filed: Sep. 21, 2009

(65) Prior Publication Data

US 2010/0082786 A1    Apr. 1, 2010

(30) Foreign Application Priority Data

Sep. 26, 2008   (JP) ................................. 2008-249284

(51) Int. Cl.
*G06F 15/173*   (2006.01)
*H04L 12/28*   (2006.01)
(52) U.S. Cl. ........................ 709/225; 709/223; 370/255
(58) Field of Classification Search .................. 709/223, 709/225, 229; 370/255
See application file for complete search history.

(56) References Cited

U.S. PATENT DOCUMENTS

| | | | |
|---|---|---|---|
| 2005/0188085 A1* | 8/2005 | Lin et al. | 709/225 |
| 2007/0276931 A1* | 11/2007 | Mahdavi et al. | 709/223 |
| 2007/0283043 A1 | 12/2007 | Kiyohara et al. | |
| 2008/0043634 A1* | 2/2008 | Wang et al. | 370/252 |
| 2010/0064049 A1* | 3/2010 | Magharei et al. | 709/229 |

FOREIGN PATENT DOCUMENTS

| | | |
|---|---|---|
| JP | A-2005-332133 | 12/2005 |
| JP | A-2006-197400 | 7/2006 |
| JP | A-2007-058597 | 3/2007 |
| JP | A-2008-84030 | 4/2008 |

OTHER PUBLICATIONS

Bin Fan, Dah-Ming Chiu, John C.S. Lui "Stochastic Analysis and File Availability Enhancement for BT-like File Sharing Systems", IEEE, 2006.*
Oct. 20, 2011 Chinese Office Action issued in Chinese Application No. 200910179747.7 (with translation).
Takahashi et al., "QoS Control by p-persistent on Wide Area Broadband Wireless Access Networks", Technical study report of Institute of Electronics, Information Engineers, Nov. 9, 2006, vol. 106, No. 355, pp. 79-83 (with English-language abstract).
May 29, 2012 Office Action issued in Japanese Patent Application No. 2008-249284 (with English-language translation).
Aug. 21, 2012 Office Action issued in Japanese Application No. 2008-249284 (with translation).

* cited by examiner

*Primary Examiner* — Boris Gorney
(74) *Attorney, Agent, or Firm* — Oliff & Berridge, PLC

(57) ABSTRACT

When acquisition processing of content information starts, a terminal apparatus executes acquisition permission determination processing of content information where permission probability is increased along with a lapse of time from starting of the acquisition processing of the content information for every predetermined period. When a result of the determination processing allows the acquisition of the content information, the terminal apparatus acquires the content information from another terminal apparatus.

13 Claims, 15 Drawing Sheets

Fig. 3

| PREFIX | | -0- | -1- | -2- | -3- |
|---|---|---|---|---|---|
| LEVEL 1 | TERMINAL ID | 0100 | 1133 | 2133 | 3213 |
| | IP ADDRESS | 10.123.20.73 | | 51.10.20.13 | 41.120.10.23 |
| LEVEL 2 | TERMINAL ID | 1003 | (11xx) | 1221 | 1313 |
| | IP ADDRESS | 21.10.210.13 | | 21.13.21.13 | 11.130.20.143 |
| LEVEL 3 | TERMINAL ID | 1103 | 1110 | 1122 | (113x) |
| | IP ADDRESS | 41.10.217.3 | 111.12.20.1 | 61.11.20.13 | |
| LEVEL 4 | TERMINAL ID | 1130 | 1131 | 1132 | (1133) |
| | IP ADDRESS | 121.150.10.13 | 216.11.210.11 | 210.10.10.13 | |

Fig. 6

|   | CONTENT ID | TERMINAL ID | IP ADDRESS |
|---|---|---|---|
| 1 | 3020 | 0213 | 60.32.72.101 |
| 2 | 3020 | 1002 | 221.172.2.21 |
| 3 | 3020 | 1301 | 100.23.156.1 |
| 4 | 3020 | 2113 | 60.32.72.103 |
| 5 | 3020 | 2333 | 192.168.0.21 |
| 6 | 3020 | 3210 | 221.173.2.22 |
| 7 | 3020 | 0312 | 152.105.11.123 |

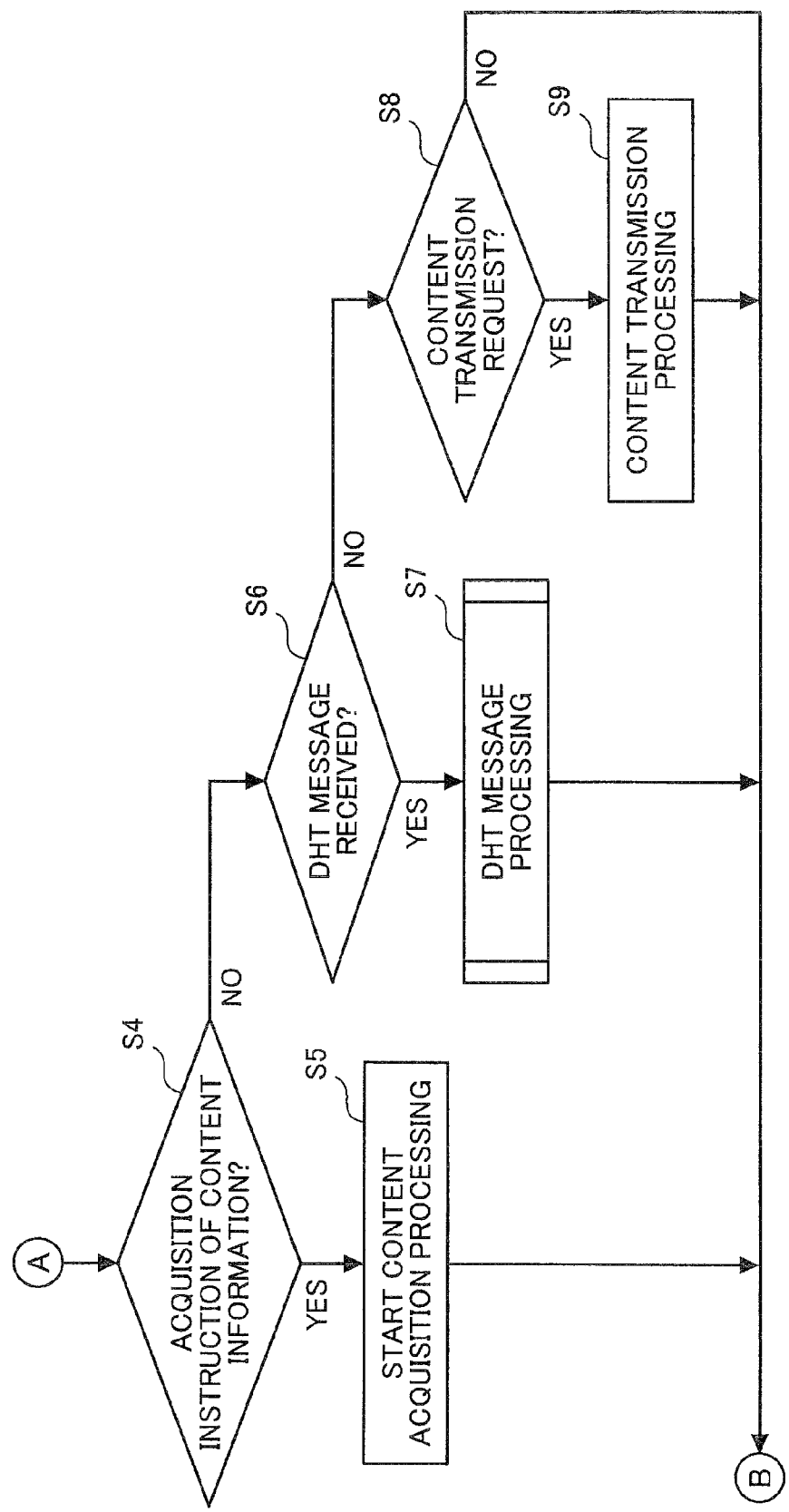

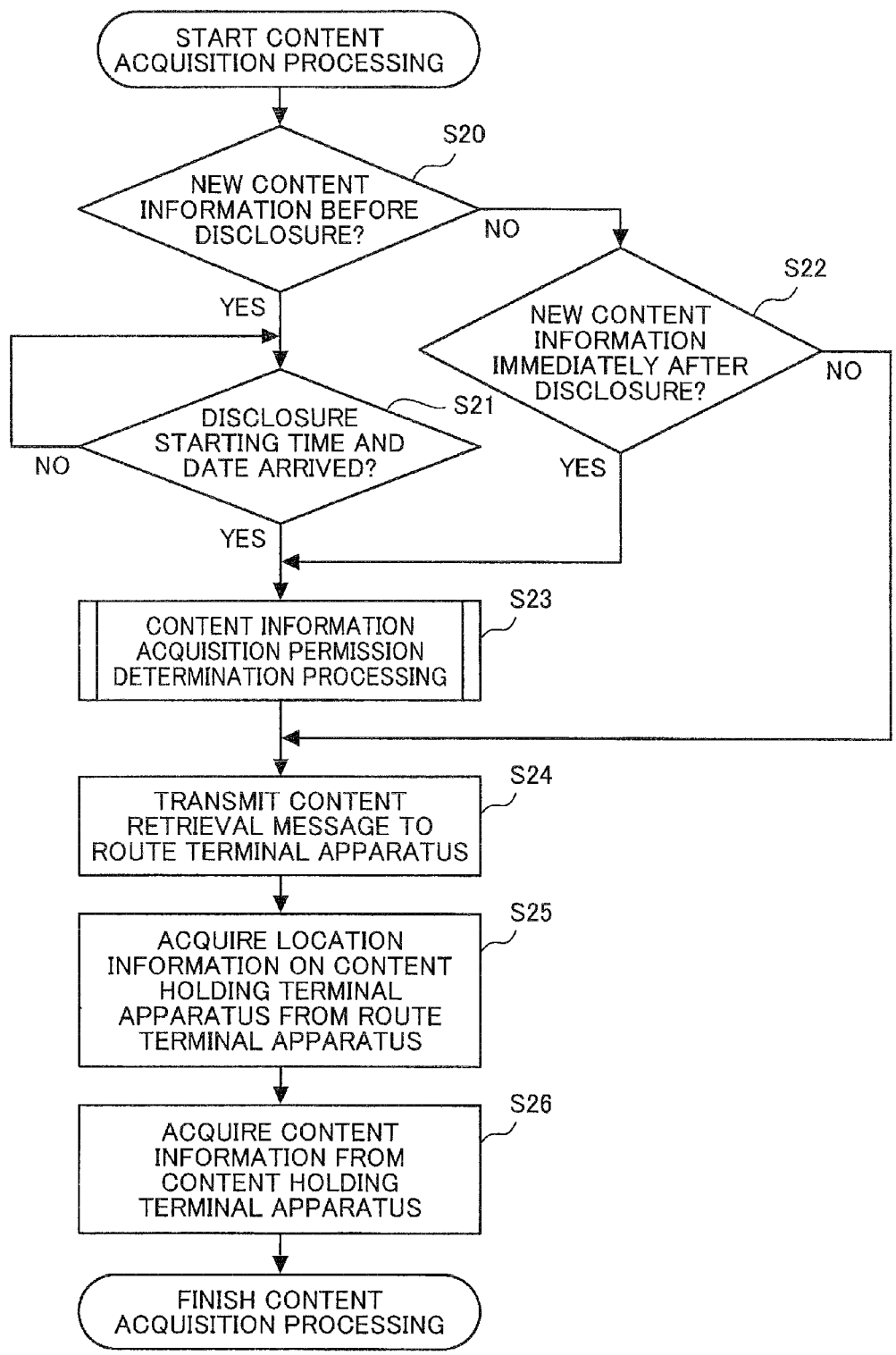

COMMUNICATION SYSTEM, TERMINAL APPARATUS, RECORDING MEDIUM WHICH RECORDS PROGRAM OF TERMINAL APPARATUS AND CONTENT INFORMATION ACQUIRING METHOD

CROSS-REFERENCE TO RELATED APPLICATIONS

This application is based on and claims the benefit of priority from Japanese Patent Application No. 2008-249284 filed on Sep. 26, 2008, the entire contents of which are incorporated herein by reference.

BACKGROUND

1. Field

The present invention relates to a Peer to Peer (P2P) type communication system which includes a plurality of terminal apparatuses (nodes) connected to a network and allows the transmission and reception of content information (for example, data such as music, movies or talk programs) among the terminal apparatuses, a terminal apparatus, a recording medium which records a program of the terminal apparatus, and a content information acquiring method.

2. Description of the Related Art

Recently, content distribution services such as VOD (Video On Demand) have been offered along with the spreading of broadband. As a new mode which replaces a server client method which is a main stream mode in the current content distribution, a technique referred to as Peer to Peer type communication system has been attracting attentions.

With respect to the Peer to Peer type communication system, for example, in an overlay network which is logically constructed by making use of a distributed hash table (hereinafter, referred to as DHT), each terminal apparatus does not recognize the location information (for example, IP addresses), which is link information, on all terminal apparatuses participating in the overlay network. That is, each terminal apparatus holds (stores) only the location information on some terminal apparatuses acquired at the time of participating the overlay network or the like. Each terminal apparatus makes an inquiry, the transmission and reception and the like of content information based on such location information (see JP-A-2006-197400).

In such a communication system, content information which is distributed and disclosed to some of terminal apparatuses which participate in the system from a server or the like is transmitted or received among the terminal apparatuses so that the number of terminal apparatuses which can distribute content information is sequentially increased.

SUMMARY

When the distribution service of the content information is offered in the communication system which uses the distributed storage technique, the number of terminal apparatuses which hold the new content information at the time of starting the disclosure of the new content information is small and hence, accesses are concentrated on the terminal apparatuses which hold the new content information.

For example, to consider a case where the disclosure of the new content information is announced before the new content information is disclosed, when it is possible for users of the terminal apparatuses to reserve the acquisition of content information which the users want in advance, accesses are concentrated on popular content information from the terminal apparatuses with which the reservation of acquisition of the content information is made after the content information is disclosed.

Once accesses are concentrated on the popular content information in this manner, there may be a possibility that the network becomes congested.

According to one aspect of the present invention, there is provided a terminal apparatus in a communication system including a plurality of terminal apparatus and being configured to perform transmission and reception of content information between the terminal apparatuses via a network, the terminal apparatus comprising: a content acquisition unit which is configured to acquire content information from another apparatus via the network; a content storage unit which is configured to store the content information acquired by the content acquisition unit; a content transmission unit which is configured to transmit the content information stored in the content storage unit to another terminal apparatus capable of transmitting/receiving the content information in response to a request from said another terminal apparatus via the network; and a control unit which is configured to, when acquisition processing of the content information starts, execute acquisition permission determination processing of the content information where permission probability which permits the acquisition of the content information is increased along with a lapse of time from starting of the acquisition processing of the content information for every predetermined period, wherein the content acquisition unit is configured to, when the control unit allows the acquisition of the content information based on the permission probability, acquire the content information from another terminal apparatus capable of transmitting/receiving the content information.

According to another aspect of the present invention, there is provided a communication system including a plurality of terminal apparatuses and being configured to perform transmission and reception of content information between the terminal apparatuses via a network, wherein each said terminal apparatus comprises: a content acquisition unit which is configured to acquire content information from another apparatus via the network; a content storage unit which is configured to store the content information acquired by the content acquisition unit; and a content transmission unit which is configured to transmit the content information stored in the content storage unit to another terminal apparatus capable of transmitting/receiving the content information in response to a request from said another terminal apparatus via the network; and a control unit which is configured to, when acquisition processing of the content information starts, execute acquisition permission determination processing of the content information where permission probability which permits the acquisition of the content information is increased along with a lapse of time from starting of the acquisition processing of the content information for every predetermined period, wherein the content acquisition unit is configured to, when the control unit allows the acquisition of the content information based on the permission probability, acquire the content information from another terminal apparatus capable of transmitting/receiving the content information.

According to still another object of the present invention, there is provided a method of acquiring content information on a terminal apparatus in a communication system including a plurality of terminal apparatus and being configured to perform transmission and reception of content information between the terminal apparatuses via a network, the method comprising the steps of acquiring content information from another apparatus via the network; storing the content information acquired by the content acquisition unit in a content storing unit; and transmitting the content information stored in the content storage unit to another terminal apparatus capable of transmitting/receiving the content information in response to a request from said another terminal apparatus via the network; and executing acquisition permission determination processing of the content information where permission probability which permits the acquisition of the content information is increased along with a lapse of time from starting of the acquisition processing of the content information for every predetermined period when acquisition processing of the content information starts, wherein in the step of acquiring content information from another apparatus via the network, when a result of the acquisition permission determination processing allows the acquisition of the content information based on the permission probability, the content information is acquired from another terminal apparatus capable of transmitting/receiving the content information.

According to still another aspect of the present invention, there is provided a computer readable recording medium recording a program to make a computer function as a terminal apparatus in a communication system including a plurality of terminal apparatus and being configured to perform transmission and reception of content information between the terminal apparatuses via a network, the storage medium storing computer instructions for configuring the computer to perform the steps of: acquiring content information from another apparatus via the network; storing the content information acquired by the content acquisition unit in a content storing unit; and transmitting the content information stored in the content storage unit to another terminal apparatus capable of transmitting/receiving the content information in response to a request from said another terminal apparatus via the network; and executing acquisition permission determination processing of the content information where permission probability which permits the acquisition of the content information is increased along with a lapse of time from starting of the acquisition processing of the content information for every predetermined period when acquisition processing of the content information starts, wherein in the step of acquiring content information from another apparatus via the network, when a result of the acquisition permission determination processing allows the acquisition of the content information based on the permission probability, the content information is acquired from another terminal apparatus capable of transmitting/receiving the content information.

BRIEF DESCRIPTION OF THE DRAWINGS

FIG. 3 is a view showing one example of a routing table;

FIG. 6 is a view showing one example of an index table;

FIG. 13 is a flowchart of content acquisition processing with respect to the terminal apparatus shown in FIG. 11;

DETAILED DESCRIPTION

Hereinafter, one embodiment of the present invention is explained specifically. Although this embodiment is explained by taking a Peer to Peer type communication system which uses a distributed hash table as an example, the present invention is not limited to such a communication system provided that the communication system is the Peer to Peer type communication system.

[1. Constitution or the Like of Communication System S]

Figure 1:
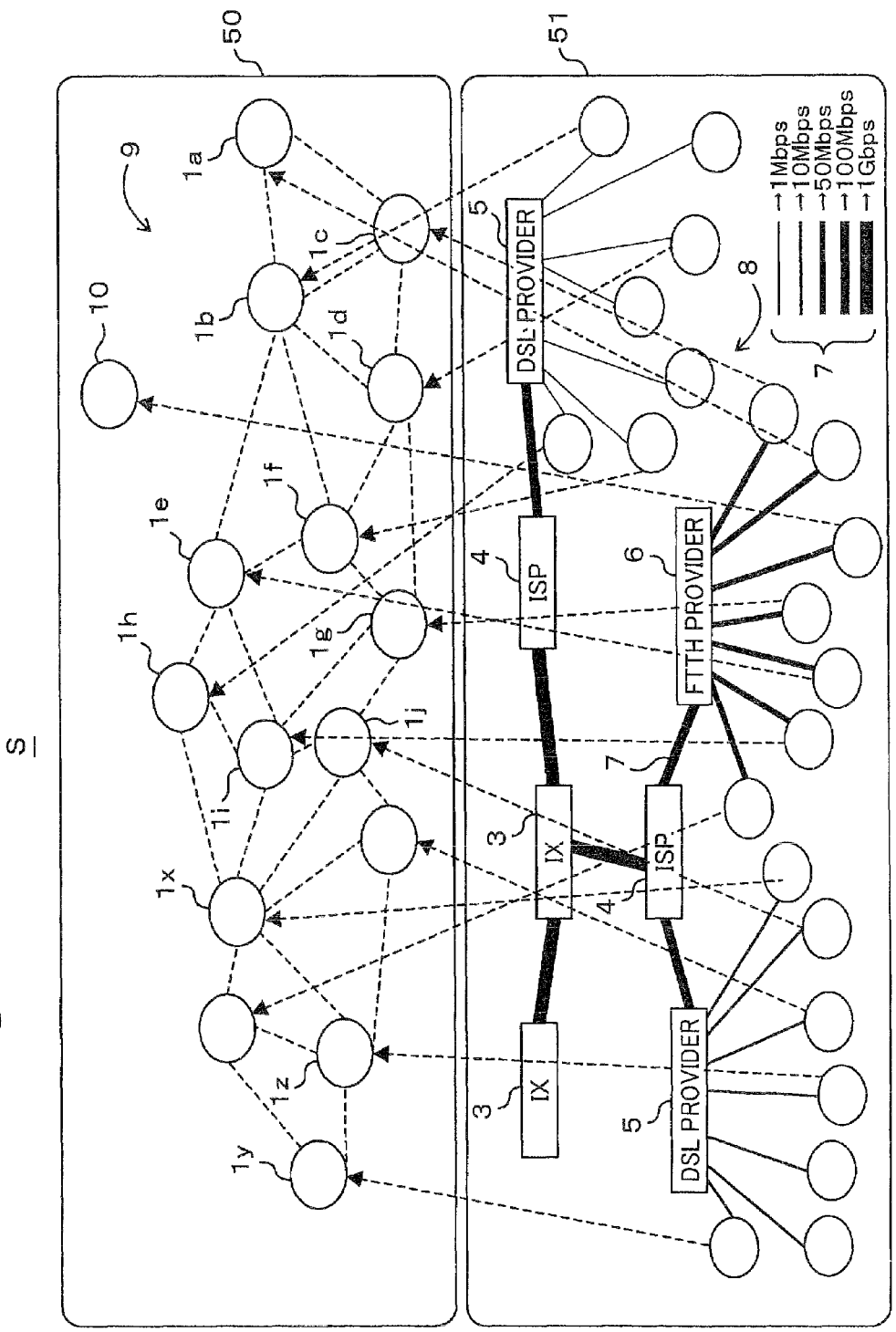
FIG. 1 is a view showing one example of a connection mode of respective terminal apparatuses and a center server of a communication system according to one embodiment of the present invention.
Figure 2:
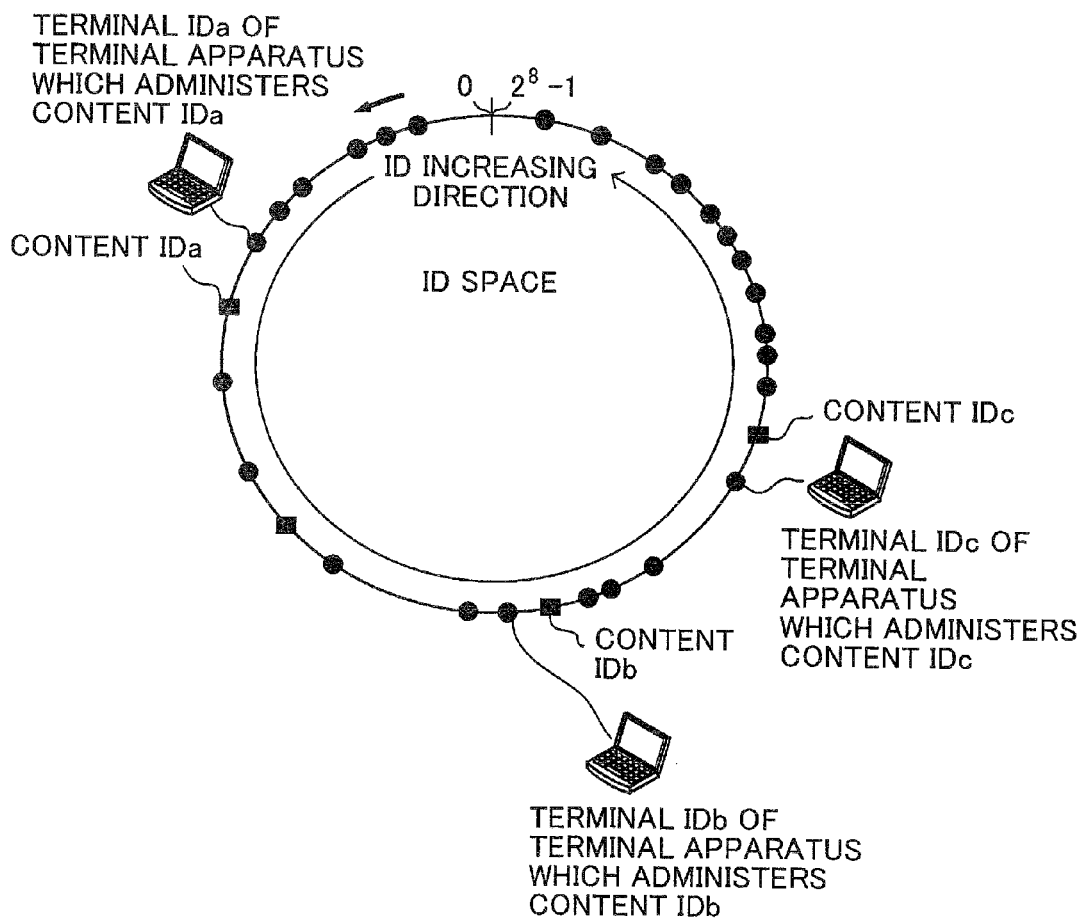
FIG. 2 is an explanatory view of an ID space.

First of all, the summary of the communication system according to this embodiment is explained in conjunction with FIG. 1 and FIG. 2.

A network 8 such as the Internet (network of a real world) is constituted of parts disposed inside a lower frame 51 shown in FIG. 1. That is, the network 8 includes IXs (Internet eXchange) 3, ISPs (Internet Service Provider) 4, a DSL (Digital Subscriber Line) provider (or an apparatus thereof) 5, an FTTH (Fiber to the Home) provider (or an apparatus thereof) 6, communication lines (for example, telephone lines, optical cables or the like) 7 and the like.

The communication system S is constituted of parts disposed inside an upper frame 50 shown in FIG. 1. That is, the communication system S includes a plurality of terminal apparatuses (nodes) $1a$, $1b$, $1c$ ... $1x$, $1y$, $1z$ ... which are connected with each other via the network 8 thus constructing a Peer to Peer (P2P) type overlay network 9. The overlay network 9 implies a network which constitutes a virtual link formed using the existing network 8. In the explanation made hereinafter, for the sake of convenience, there may be a case that the terminal apparatus 1 implies any one of terminal apparatuses $1a$, $1b$, $1c$ ... $1x$, $1y$, $1z$ ... or all terminal apparatuses $1a$, $1b$, $1c$ ... $1x$, $1y$, $1z$ ....

As a terminal identification number (hereinafter referred to as "terminal ID") which is identification information on each terminal apparatus 1 participating in the communication system S, the number unique to every terminal apparatus 1 (unique number) is given for every terminal apparatus 1. In the explanation made hereinafter, a hashed value of an IP address by a common hash function is used as the terminal ID. Since the hash function is known, the detailed explanation of the hash function is omitted.

Further, in the plurality of terminal apparatuses 1 which participate in the communication system S, content information (for example, data such as music data, movie data or document data) which constitutes common information distributed from one terminal apparatus 1 to other terminal apparatuses 1 is stored (held) in a distributed manner. Content identification information (hereinafter referred to as "content ID") which is an identification number unique to every content information is also given to the content information.

In this manner, the terminal IDs which are given to the respective terminal apparatuses 1 and the content IDs which are given to the respective content information are generated by the common hash function and hence, as shown in FIG. 2, it is considered that the terminal IDs and the content IDs are present on the same ring-shaped ID space in a scattered manner without being largely concentrated on portions of the ID space. FIG. 2 illustrates a case in which the terminal ID and the content ID of quaternary number ("0000" to "3333") of 8 bits are given. In the drawing, circular dots indicate the terminal IDs, and square dots indicate the content IDs. It is assumed that the ID is increased in the counterclockwise direction.

Here, the terminal apparatus holding the content information transmitted/received within the communication system S is hereinafter referred to as "content holding terminal apparatus", and the terminal apparatus which holds the location information (here, the IP address) of the content holding terminal apparatus (hereinafter referred to as "route terminal apparatus") is assumed as the terminal apparatus having the terminal ID which has predetermined relevance with the content ID of the content information. For example, in FIG. 2, the terminal apparatus 1 having the terminal IDa is the route terminal apparatus which knows the terminal apparatus 1 in which the content information having the content IDa is held. Further, the "terminal ID which has predetermined relevance with the content ID" is a terminal ID which is closer to the content ID. The term "closer to" implies that the terminal ID does not exceed the content ID and the difference between the content ID and the terminal ID is the smallest. Provided that the above-mentioned "predetermined relevance" is consistent, it is not always necessary that the terminal ID is "closer to" the content ID.

The communication system S, as shown in FIG. 1, includes a center server 10 which has a function of supplying content information into the inside of the communication system S. That is, the center server 10 has a function of distributing content information to the terminal apparatus 1 in the inside of the communication system S so as to form the terminal apparatus 1 into the content holding terminal apparatus, a function of generating a list of content information which can be transmitted/received among the terminal apparatuses 1 in the communication system S (hereinafter referred to as "content catalog") and a function of supplying the content catalogue to the terminal apparatus 1 and the like. The content catalog contains the content ID, information on disclosure starting time and date, name of content and the like which are given to each content information.

The communication system S according to this embodiment uses a routing table held in each terminal apparatus 1 for allowing the terminal apparatus 1 to access another terminal apparatus 1. The routing table is formed when each terminal apparatus 1 participates in the communication system S or the like.

The routing table is configured as shown in FIG. 3. That is, in accordance with a predetermined rule, the terminal apparatuses 1 which the communication system S includes are divided into a plurality of groups and the respective groups are set as groups of level 1. The group to which its own apparatus belongs among the groups of level 1 is further divided into a plurality of groups and these respective groups are set as groups of level 2. Grouping similar to grouping for forming the groups of level 2 is successively performed until the respective groups of level n (n being natural number of 3 or more) are obtained. The respective location information (IP address or IP addresses) of at least one terminal apparatus 1 belonging to the respective groups of respective levels (excluding the group to which the own terminal apparatus 1 belongs) is stored respectively.

[2. Method of Disclosing Content Information]

With respect to the communication system S having such a constitution, explained hereinafter is a technique in which, for example, one terminal apparatus 1 discloses new content information such that other terminal apparatuses 1 on the communication system S can retrieve new content information. Here, steps of disclosing content information supplied (distributed) to the terminal apparatus 1m having the terminal ID "1301" is explained. Other content information is also disclosed in accordance with similar steps.

Figure 4:
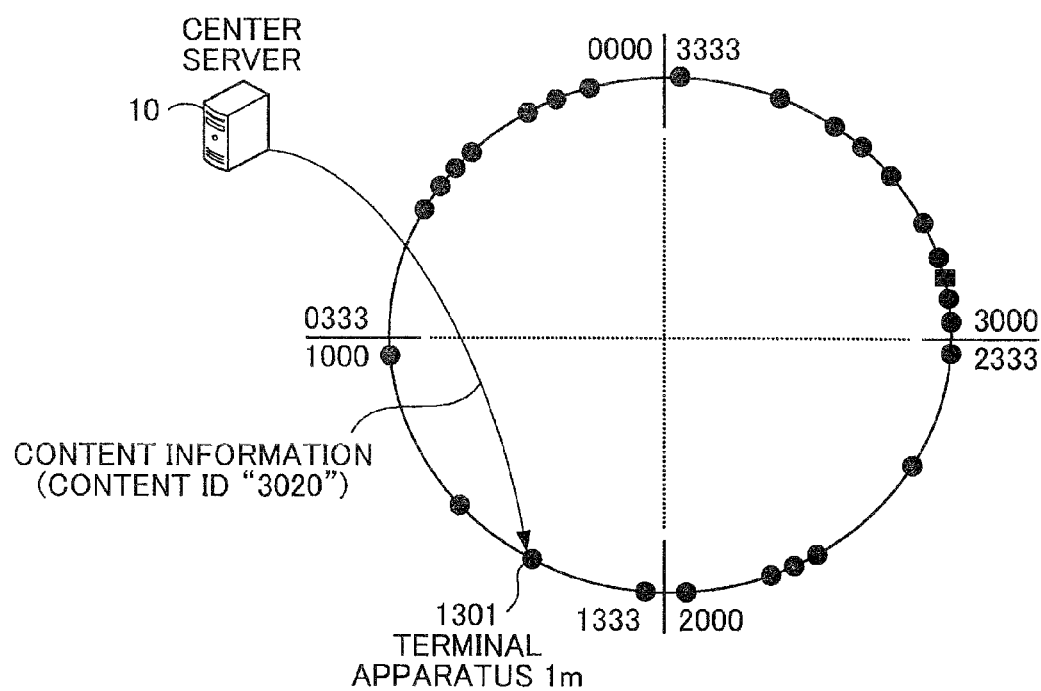
FIG. 4 is a view showing a mode in which content information is supplied to the terminal apparatuses from the center server.
Figure 5:
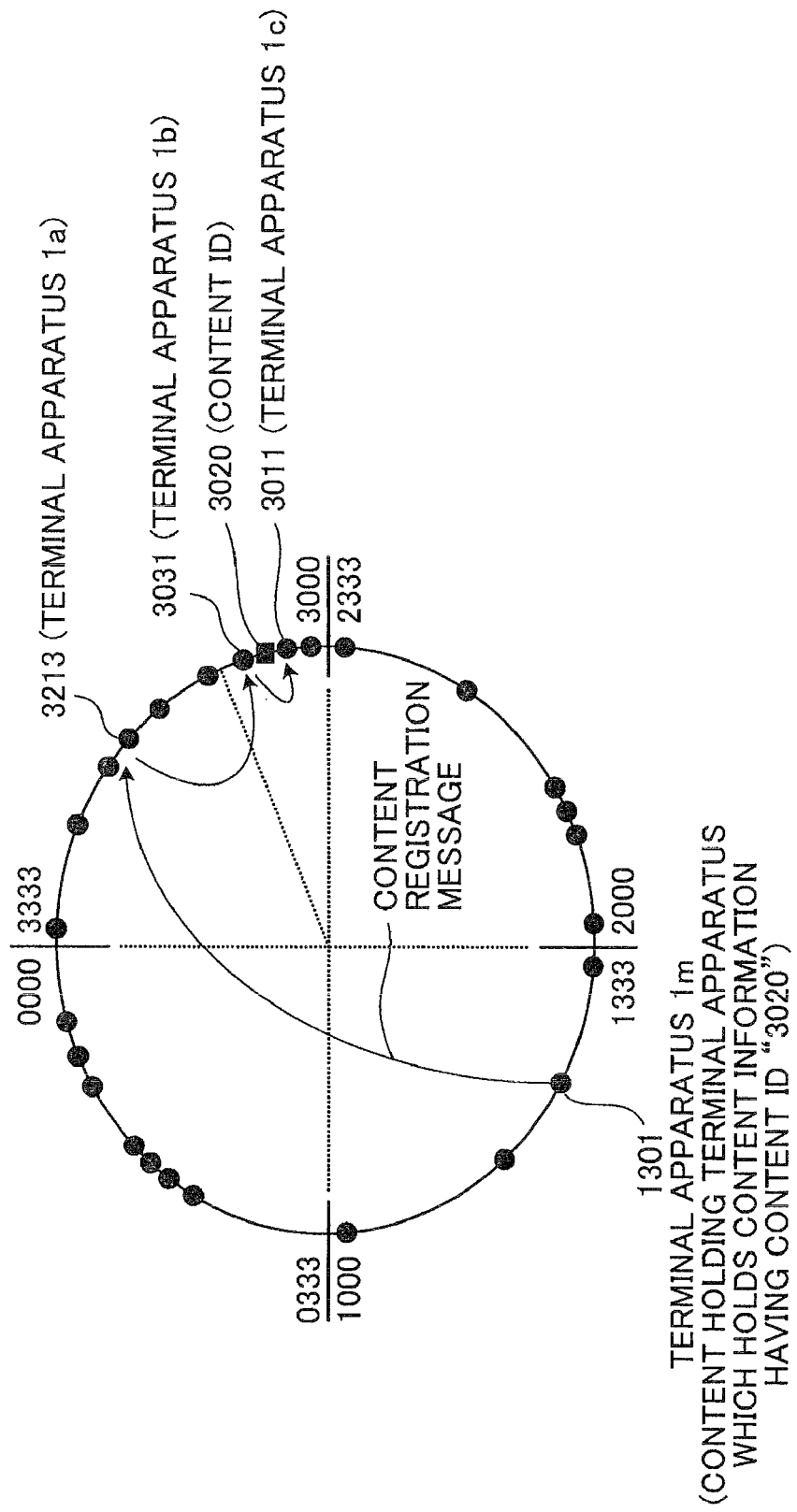
FIG. 5 is a view showing a mode in which a content registration message of a content holding terminal apparatus is transferred by DHT routing.

When the new content information is supplied to the terminal apparatus 1m from the center server 10 as shown in FIG. 4 so that the terminal apparatus 1m is formed into the content holding terminal apparatus having content ID "3020", the terminal apparatus 1m, as shown in FIG. 5, generates a content registration message including content ID "3020" as destination identification information, and transmits the content registration message by reference to the routing table which the terminal apparatus 1m holds by itself. When the terminal apparatus 1m holds the routing table similar to the example shown in FIG. 3, the content ID "3020" is an area "3XXX" and hence, out of the terminal apparatuses 1 belonging to the area "3XXX", the content registration message is transmitted to the terminal apparatus 1a (terminal ID "3213") knowing the location information (IP address).

Next, the terminal apparatus 1a which receives the content registration message determines whether or not the content registration message is a message addressed to its own terminal apparatus 1a. The determination whether or not the content registration message is the message addressed to its own terminal apparatus 1a is made based on whether or not the destination identification information is closer to the terminal ID which is the identification information on its own terminal apparatus 1a based on the routing table. Then, when the terminal ID of another terminal apparatus 1 is closer to the destination identification information than the terminal ID of its own terminal apparatus 1a, the terminal apparatus 1a transfers the content registration message to the terminal apparatus 1b (terminal ID "3031") knowing the location information (IP address) out of the terminal apparatuses 1 belonging to the area "30XX" by reference to a table of the routing table which the terminal apparatus 1a per se holds.

When the transfer of the content registration message advances in such a manner that digits of the content ID are sequentially made compatible in order from an uppermost digit by DHT routing, and the content registration message finally arrives at the terminal apparatus 1c which administers the content information, that is, the route terminal apparatus, the terminal apparatus 1c per se determines that the terminal apparatus 1c is to be the route terminal apparatus of the content information. Then, the terminal apparatus 1c stores the content ID, the terminal ID and the location information (IP address) of the content holding terminal apparatus and the like contained in the content registration message(hereinafter, these information being referred to as "index information") in the index table shown in FIG. 6.

[3. Content Information Acquiring Method]

Figure 7:
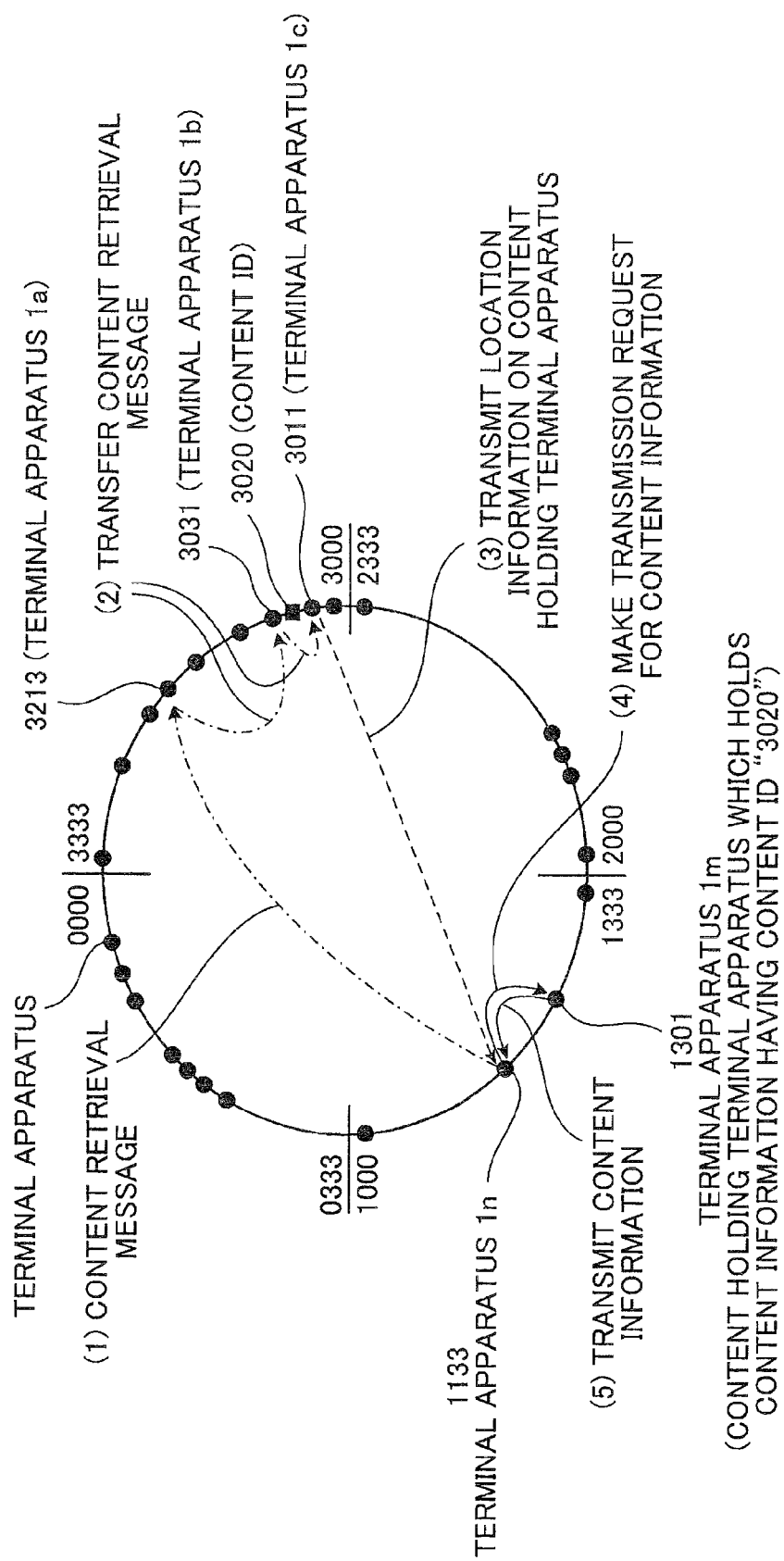
FIG. 7 is a view showing one example of a mode in which a terminal apparatus holding content information is retrieved by DHT routing.

Next, one example of a retrieval method of the terminal apparatus 1 which holds the content information is explained in conjunction with FIG. 7. Here, the explanation is made with respect to a case in which the terminal apparatus 1n having terminal ID "1133" looks for content information having content ID "3020" as a requester. Other content information is also looked for based on the content ID in accordance with similar steps.

The requester 1n, as shown in FIG. 7, transmits a transmission request for content holding terminal apparatus information (information containing an IP address which is location information on the content holding terminal apparatus) (hereinafter referred to as "content retrieval message") by setting the terminal ID of the terminal apparatus 1 having the terminal ID in the area to which the content ID "3020" belongs as the destination and by setting the content ID "3020" as the destination identification information (see step S101 in FIG. 7). Then, this content retrieval message is also sequentially transferred in accordance with the routing table in the same manner as the above-mentioned content registration message (see step S102 in FIG. 7). When the content retrieval message finally arrives at the terminal apparatus 1c (terminal ID "3011") which administers content information which constitutes an object of the retrieval, that is, the route terminal apparatus, the route terminal apparatus 1c retrieves the content ID "3020" contained in the content retrieval message from the index information which the route terminal apparatus per se administers in the index table. Then, the route terminal apparatus 1c replies the IP address or the like of the content holding terminal apparatus which possesses the content information (the terminal apparatus 1m in this embodiment) to the requester 1m (see step S103 in FIG. 7).

The requester 1n knows the location information on the content information having the content ID "3020", that is, the IP address of the content holding terminal apparatus 1m holding the content information having the content ID "3020" by receiving such an IP address from the route terminal apparatus 1c. Then, the requester 1n makes a transmission request for the content information having the content ID "3020" to the content holding terminal apparatus lm having the content ID "3020" (see step S104 in FIG. 7) so as to acquire the content information having the content ID "3020" from the content holding terminal apparatus 1m (see step S105 in FIG. 7).

When the requester 1n acquires the content information having the content ID "3020" from the content holding terminal apparatus 1m, the requester 1n reproduces the content information using a reproduction unit. Here, the requester 1n stores the acquired content information in a content storage unit so that the requester 1n becomes the content holding terminal apparatus of the content information having the content ID "3020". Then, the requester 1n transmits a content registration message using the content ID "3020" as destination identification information, and registers the location information (IP address) or the like of its own apparatus 1n in the index table of the route terminal apparatus 1c.

In acquiring the content information, the content ID of the content information becomes necessary. However, each terminal apparatus 1 is configured to acquire a content catalog from the center server 10 periodically at the time of participating in the communication system S and after participating in the communication system S and hence, when the terminal apparatus 1 functions as a requester, the terminal apparatus selects content information which becomes an object of acquisition from the content catalog, and acquires the content ID of the selected content information from the content catalog.

[4. Restriction on Acquisition of New Content Information]

Each terminal apparatus 1 can acquire the content information by the above-mentioned acquiring method. However, in the communication system S of this embodiment, to prevent the excessive concentration of accesses to the content holding terminal apparatus when the new content information is disclosed within the communication system S, the present invention restricts a request from each terminal apparatus 1.

Hereinafter, the restriction on acquisition of new content information in the terminal apparatus 1 is explained in conjunction with drawings.

Each terminal apparatus 1 starts the acquisition processing of content information when disclosure timing of the content information comes. In this acquisition processing, the terminal apparatus 1 executes acquisition permission determination processing of the content information in which permission probability rises along with a lapse of time from starting the processing for every predetermined period, and acquires the content information from the content holding terminal apparatus when a result of the acquisition permission determination processing allows the acquisition of the content information.

Figure 8:
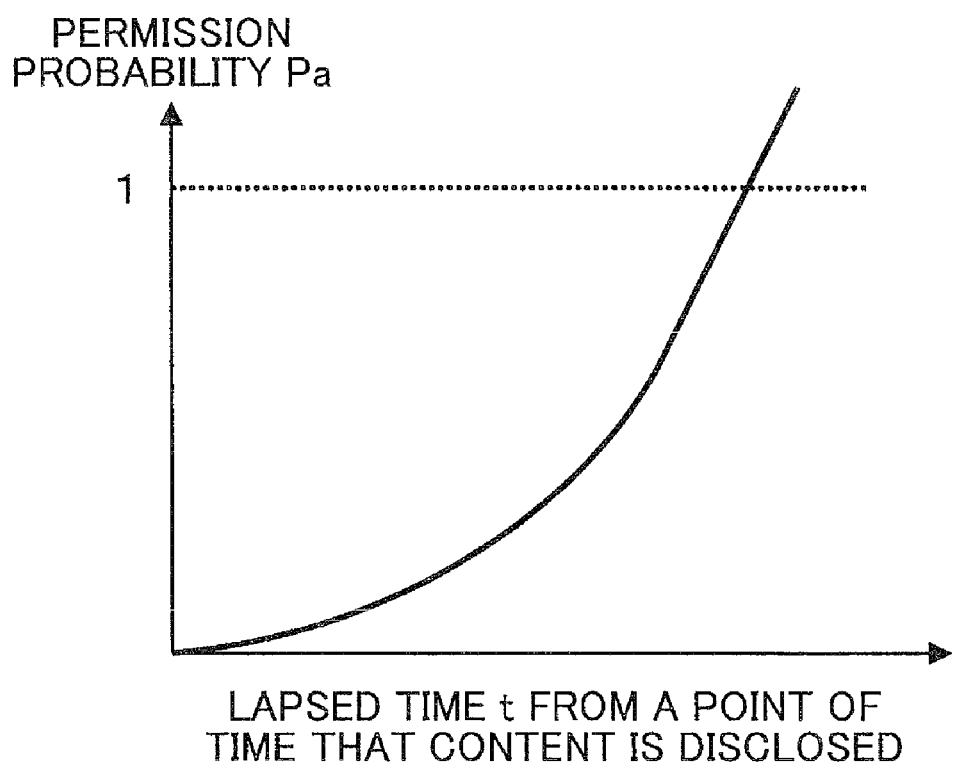
FIG. 8 is a graph showing the relationship between a lapsed time from a point of time that content information is disclosed and content acquisition probability with respect to a terminal apparatus.

The acquisition permission determination processing of the content information in each terminal apparatus 1 is, as shown in. FIG. 8, processing which permits the acquisition of the content information at the permission probability Pa which exponentially rises along with a lapse of time from a point of time that the content information is disclosed.

For example, the permission probability Pa which rises exponentially can be expressed by a following formula (1).

$$\text{Probability } Pa = (C \times (1+C)^{(i-1)}) / (N - (1+C)^{(i-1)}) \tag{1}$$

In the above formula (1), "C" indicates the number of other terminal apparatuses 1 to which the same content information can be transmitted simultaneously from the terminal apparatus 1 (simultaneous transmission possible number), "i" indicates a counter value which is incremented for every predetermined time ta from a point of time that the disclosure of the content information is started, "N" indicates the number of terminal apparatuses 1 which want to acquire new content information at the time of disclosure of the content information (hereinafter also referred to as "distribution terminal number"). Further, the above-mentioned formula (1) expresses the permission probability Pa when the number of the content holding terminal apparatus is one at the time of starting the disclosure of the content information.

Hereinafter, one example of an acquisition permission determination processing operation at the permission probability Pa expressed by the above-mentioned formula (1) is explained. Here, the simultaneous transmission possible number C is 2 and the acquisition terminal number N is 10000. Further, the predetermined time ta is time necessary for transmission/reception of content information between the terminal apparatuses 1 (transmission/reception required time).

First of all, when the disclosure is started (i=0), the permission probability Pa of the acquisition permission determination processing in each terminal apparatus 1 becomes 2/9999. That is, the probability is set such that out of the terminal apparatuses 1 which want to acquire new content information, approximately two sets of terminal apparatuses 1 are only permitted to make an acquisition request for the content information. Accordingly, the request for the content information is made from the number of (here, two sets of) terminal apparatuses 1 to which one set of content holding terminal apparatus existing at the time of starting disclosure (i=0) can distribute the content information and hence, the request for the content information can be properly suppressed. Due to such processing, the number of the content holding terminal apparatuses becomes three.

Next, when a lapsed time from starting of disclosure becomes a predetermined time ta (i=1), the permission probability Pa of the acquisition permission determination processing in each terminal apparatus 1 becomes 6/9997. That is, the probability is set such that out of the terminal apparatuses 1 which want to acquire new content information, six sets of terminal apparatuses 1 are permitted to make an acquisition request for the content information. Accordingly, the request for the content information is made from the number of (here, six sets of) terminal apparatuses 1 to which three sets of content holding terminal apparatuses existing when the lapsed time from starting of the disclosure is the predetermined time ta (i=1) can distribute the content information and hence, the request for the content information can be properly suppressed. Due to such processing, the number of the content holding terminal apparatuses becomes nine.

In the same manner, the permission probability Pa rises exponentially, and when the lapsed time from starting of disclosure becomes 8×predetermined time ta (i=8), the permission probability Pa of the acquisition permission determination processing with respect to each terminal apparatus 1 becomes 4374/7813. Here, the number of content holding terminal apparatuses becomes approximately 6560 sets and hence, when the lapsed time from starting of the disclosure is 9×predetermined time ta (i=9), all terminal apparatuses 1 which want to acquire new content information can acquire new content information.

By increasing the permission probability Pa exponentially in this manner, the number of requests of content information from the requester can be suppressed to the number approximately equal to or less than the number of terminal apparatuses 1 to which the content holding terminal apparatuses within the communication system S can distribute the content information. Accordingly, accesses to the content holding terminal apparatus can be effectively restricted thus suppressing the excessive concentration of traffic.

Here, the route terminal apparatus of the new content information receives a content registration message from the terminal apparatus 1 which newly becomes the content holding terminal apparatus. By allowing the route terminal apparatus to transmit the location information on the same content holding terminal apparatus to the requesters within the predetermined time ta while limiting the simultaneous transmission possible number C to 2, it is possible to efficiently distribute the transmission requests of new content information from the requesters.

Here, information on disclosure starting time and date of the new content is contained in the content catalog which each terminal apparatus 1 acquires from the center server 10. The terminal apparatus 1 with which the acquisition selection of new content information is made by a user, when time and date which are written in the disclosure time and date information contained in the content catalog come, that is, when the content information stored in one or more terminal apparatuses 1 within the communication system S becomes acquirable from another terminal apparatus 1, executes the acquisition permission determination processing.

Each terminal apparatus 1, when the time and date become disclosure starting time and date contained in the new content information, starts the acquisition processing of new content information. For example, when a user of the terminal apparatus 1 selects the acquisition of non-disclosed new content information from the content catalog, the terminal apparatus 1 starts the acquisition permission determination processing of new content information from the disclosure starting time and date contained in the content catalog. On the other hand, when a user of the terminal apparatus 1 selects the acquisition of new content information immediately after disclosure from the content catalog, the terminal apparatus 1 executes acquisition permission determination processing of new content information corresponding to a lapsed time from the disclosure starting time and date contained in the content catalog. For example, when the selection of new content information immediately after the disclosure of new content information is made by a user after a lapsed time (=3×predetermined time ta) from disclosure starting time and date, the terminal apparatus 1 executes the acquisition permission determination processing of new content information by setting the counter value i to 3 or 4.

When the disclosure starting time and date are not contained in the content catalog, in acquiring the content information, the terminal apparatus 1 may inquire the disclosure starting time and date of the content information which the terminal apparatus 1 wants to acquire from the center server 10.

Figure 9:
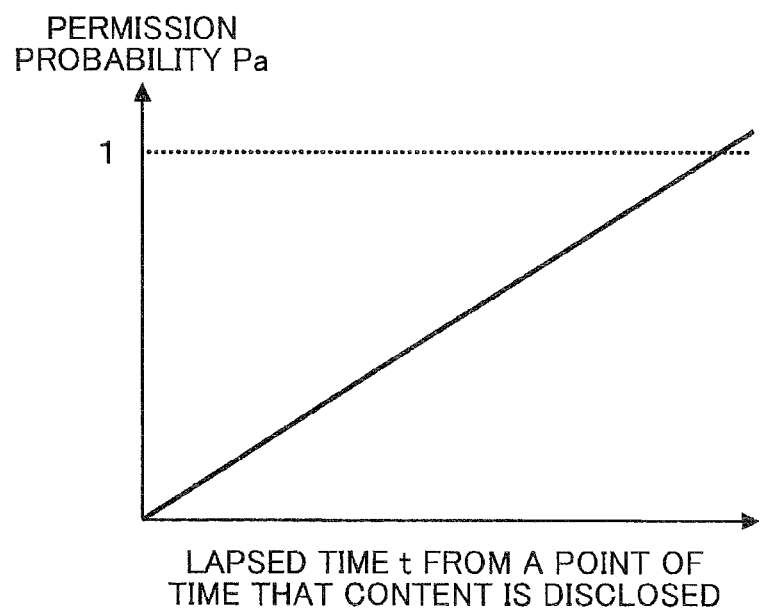
FIG. 9 is a graph showing the relationship between a lapsed time from a point of time that content information is disclosed and content acquisition probability with respect to a terminal apparatus.
Figure 10:
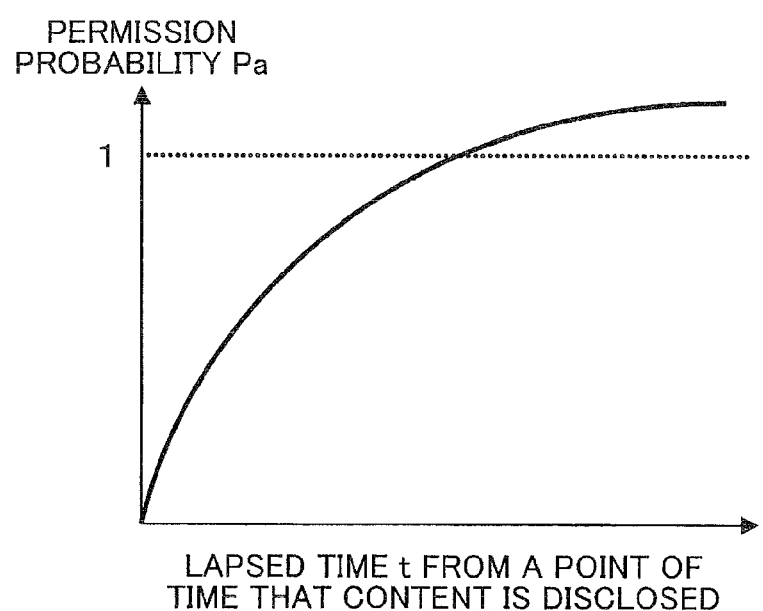
FIG. 10 is a graph showing the relationship between a lapsed time from a point of time that content information is disclosed and content acquisition probability with respect to a terminal apparatus.

Further, the explanation is made with respect to the case in which the permission probability Pa is the probability which rises exponentially corresponding to the lapsed time heretofore. However, the permission probability Pa need only to be the probability which rises corresponding to the lapsed time. For example, as shown in FIG. 9, the permission probability Pa may be the probability which rises proportionally corresponding to the lapsed time. That is, the permission probability Pa may be the probability which is increased corresponding to the lapsed time and an increase rate is constant. Further, as shown in FIG. 10, the permission probability Pa may be increased corresponding to the lapsed time and an increase rate is lowered corresponding to the lapsed time.

Each terminal apparatus 1 can also, even when all data of new content information requested by another terminal apparatus 1 is not stored therein, sequentially transmit data starting from data stored in the terminal apparatus 1 out of the new content information via the network 8.

Here, the predetermined time ta may be set to a time shorter than a time necessary for the transmission/reception of the content information between the terminal apparatuses 1 (transmission/reception required time). By setting the predetermined time ta in this manner, it is possible to distribute the new content information to the terminal apparatuses 1 within the communication system S more rapidly.

The route terminal apparatus of the new content information receives a content registration message from the terminal apparatus 1 which newly becomes the content holding terminal apparatus. By allowing the route terminal apparatus to transmit the information on the same content holding terminal apparatus to the requesters while limiting the simultaneous transmission possible number C to 2 and, at the same time, assigning priority on the location information (index information) on the terminal apparatus which newly becomes the content holding terminal apparatus, it is possible to efficiently distribute the transmission requests of new content information from the requesters.

Here, one example of the specific constitution and the manner of operation of the terminal apparatus 1 in the communication system S is explained in conjunction with drawings.

[5. Explanation of Specific Constitution and Manner of Operation of Terminal Apparatus]

Hereafter, one example of the specific constitution and the manner of operation of the terminal apparatus 1 is explained in conjunction with drawings.

(Constitution of Terminal Apparatus 1)

Figure 11:
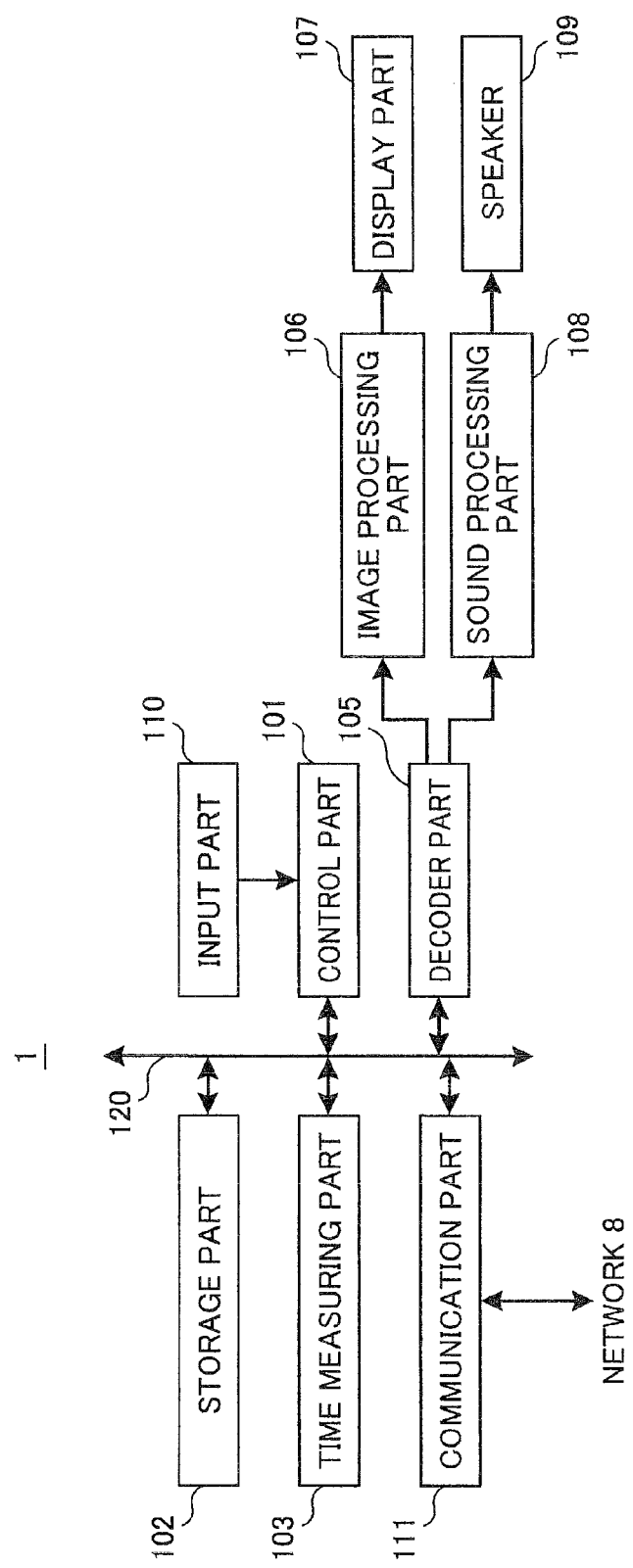
FIG. 11 is a view showing the specific constitution of the terminal apparatus.

First of all, the constitution of the terminal apparatus 1 is explained. FIG. 11 is a view showing the specific constitution of the terminal apparatus 1 in the communication system S of this embodiment.

The terminal apparatus 1 may be formed of the dedicated computer or a general-use personal computer. As shown in FIG. 11, the terminal apparatus 1 includes a control part 101, a storage part 102 which is a non-volatile memory storing the routing table, the index table, content information acquired from the center server 10 and other terminal apparatuses 1 (corresponding to one example of the content storage unit), a time measuring part 103 which measures present time and date, and a decoder part 105 which sequentially picks up and decodes content information stored in the storage part 102. The terminal apparatus 1 also includes an image processing part 106 which executes processing for converting image information out of the content information decoded by the decoder part 105 into information which can be displayed by a display part 107 described later, and the display part 107 such as a liquid crystal display device (LCD) which displays an image of content information based on an output from the image processing part 106. The terminal apparatus 1 further includes a sound processing part 108 which executes processing for converting sound information out of the content information decoded by the decoder part 105 into information which can be outputted as sound waves by a speaker 109 described later, and the speaker 109 which outputs the sound of the content information as sound waves based on the output from the sound processing part 108. The terminal apparatus 1 still further includes an input part 110 which includes a mouse, a keyboard and the like, and a communication part 111 which allows the communication between the terminal apparatus 1 and the center server 10 or other terminal apparatuses 1 via the network 8. The control part 101, the storage part 102, the time measuring part 103, the decoder part 105, and the communication part 111 are connected with each other via a system bus 120. Further, the decoder part 105, the image processing part 106, and the sound processing part 108 correspond to one example of a reproduction unit.

The control part 101 is constituted of a CPU (Central Processing Unit) and an internal memory. The internal memory stores therein an information processing program which allows the terminal apparatus 1 to participate in the communication system S, to perform the transmission and reception of the content information and the like and to reproduce the content information. The CPU reads out and executes the information processing program stored in the internal memory thus functioning as a list acquisition unit, a control unit, a content acquisition unit, a content transmission unit, a reproduction processing unit, a content catalog acquisition unit, a display processing unit and the like.

The information processing program may be, for example, downloaded into the internal memory of the control part 101 from a server (for example, a center server 10) which is connected with the network 8 via the communication part 111, or may be recorded in a recording medium such as a CD-ROM and may be read in the internal memory of the control part 101 via a recording medium drive not shown in the drawing.

(Manner of Operation of Terminal Apparatus 1)

The manner of operation of the terminal apparatus 1 having the above-mentioned constitution is specifically explained in conjunction with drawings. Respective processing described hereinafter are executed by allowing the control part 101 of the terminal apparatus 1 to function as the above-mentioned respective units and the like. In the description made hereinafter, operations of characteristic parts of the terminal apparatus 1 are mainly explained and some operations of the terminal apparatus 1 are omitted.

Figure 12A:
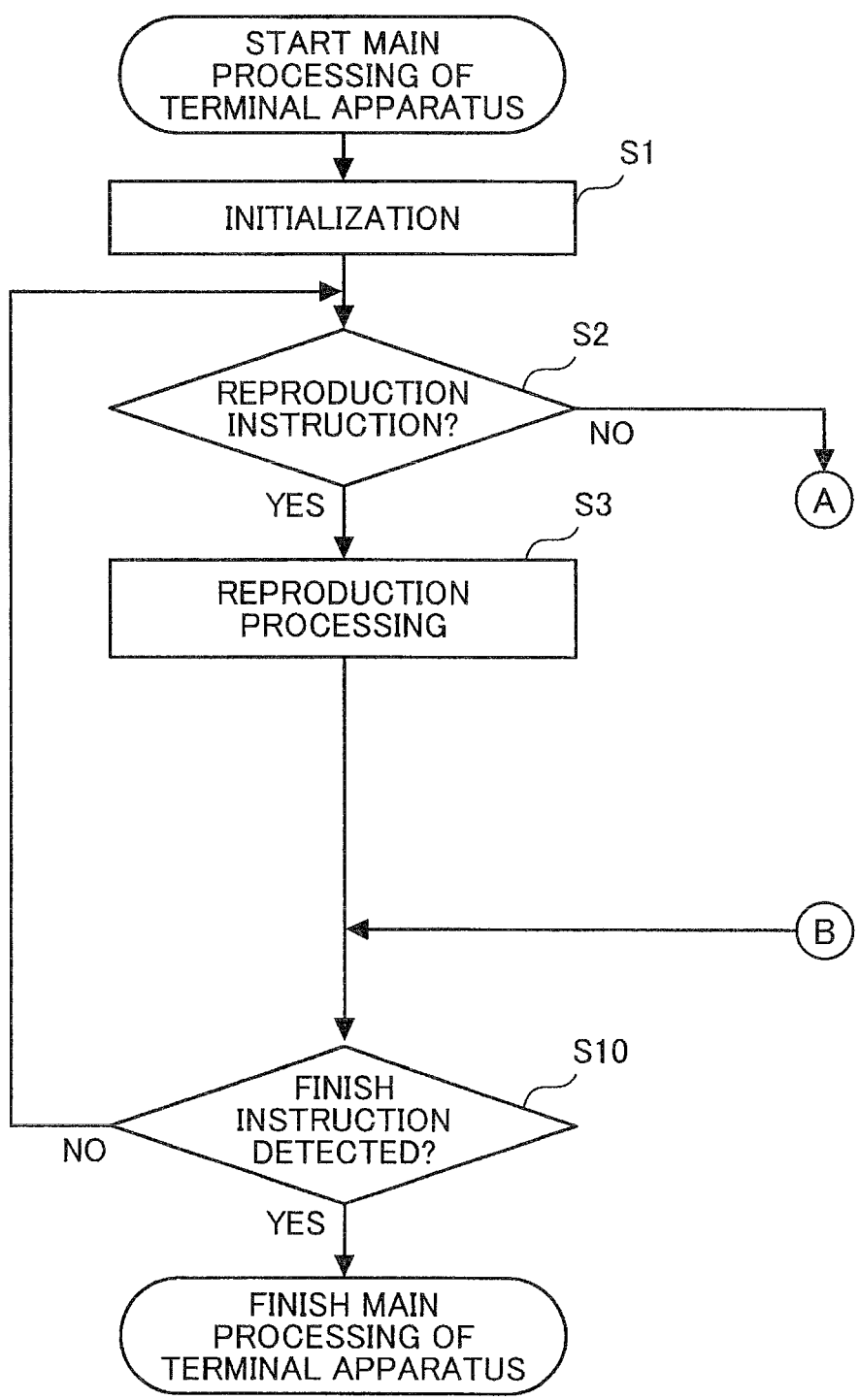
FIG. 12 is a flowchart of main processing with respect to the terminal apparatus shown in FIG. 11.

As shown in FIG. 12, when a main power source switch (not shown in the drawing) is turned on or a reset switch (not shown in the drawing) is operated in the terminal apparatus 1, the CPU of the control part 101 executes initialization (step S1). That is, the functions of the control part 101 are brought into an operable state while placing the information processing program stored in the internal memory in an executable state and, thereafter, the terminal apparatus 1 participates in the communication system S, and advances processing to step S2.

Here, the participation of the terminal apparatus 1 into the communication system S is performed as follows in accordance with processing executed by the control part 101. First of all, the control part 101 acquires the terminal ID of its own terminal apparatus 1 by calculating the IP address of its own apparatus by a predetermined hash function. The control part 101 transmits a participation message containing the location information (IP address or the like) of its own apparatus to a predetermined terminal apparatus 1 via the communication part 111 and the network 8 using such a terminal ID as destination identification information. The participation message is transferred by DHT routing. Then, another terminal apparatus 1 which receives the participation message takes out information on a table at a level corresponding to the number of transfer of the participation message from the routing table of its own apparatus, and transmits the information to the terminal apparatus 1 to which the participation message is transmitted. The control part 101 acquires the information on the routing table from the terminal apparatus 1 which receives the participation message in this manner via the network 8 and the communication part 111, generates the routing table based on these information, and participates in the communication system S.

Further, the control part 101 acquires the content catalog from the center server 10 when the terminal apparatus 1 participates in the communication system S, and displays a content of the content catalog on the display part 107. Due to such a display, a user of the terminal apparatus 1 grasps content information reproducible in the communication system S, and acquires content information by performing a predetermined operation of the input part 110. In this manner, the control part 101 functions as the list acquisition unit which acquires a list of content information which is transmissible and receivable within the communication system S.

In step S2, the control part 101 determines whether or not a reproduction instruction of content information stored in the storage part 102 is present. For example, the control part 101 displays a list of content information stored in the storage part 102 on the display part 107 as a reproduction list, and the control part 101 determines that the reproduction instruction is present when the content information is selected out of the reproduction list displayed on the display part 107 due to an operation of the input part 110 by the user.

When the control part 101 determines that the reproduction instruction is present in this processing (step S2: Yes), the control part 101 starts reproduction processing (step S3). This reproduction processing is executed such that content information on which the reproduction instruction is made is read out from the storage part 102, and the content information is processed by the above-mentioned reproduction. unit. That is, the control part 101 executes the reproduction processing by sequentially taking out the content information stored in the storage part 102, by inputting the content information into the decoder part 105, and by outputting an image or a sound corresponding to the decoded content information from the display part 107 or the speaker 109 by way of the image processing part 106 or the sound processing part 108. In this manner, the control part 101 functions as the reproduction processing unit which reproduces the content information stored in the storage part 102 using the reproduction unit.

On the other hand, when the control part 101 determines that there is no reproduction instruction (step S2: No), the control part 101 determines whether or not an acquisition instruction of the content information is present (step S4). For example, when the content information is selected out of the content catalog displayed on the display part 107 due to an operation of the input part 110 by a user, the control part 101 determines that the acquisition instruction of the content information is present.

When the control part 101 determines that the acquisition instruction of the content information is present in this processing (step S4: Yes), the control part 101 starts content acquisition processing (step S5). The content acquisition processing is constituted of a series of processing executed in steps S20 to S26 shown in FIG. 13, and the content acquisition processing is explained in detail later.

When the control part 101 determines that there is no acquisition instruction of the content information in step S4 (step S4: No), the control part 101 determines whether or not the terminal apparatus 1 receives a DHT message (for example, a content registration message, a content retrieval message or the like) from other terminal apparatuses 1 or the center server 10 via the network 8 and the communication part 111 (step S6). When the control part 101 determines that the DHT message is received in this processing (step S6: Yes), the control part 101 executes DHT message processing (step S7). The DHT message processing is constituted of a series of processing executed in steps S40 to S46 shown in FIG. 15, and the DHT message processing is explained in detail later.

When the control part 101 determines that the DHT message is not received in step S6 (step S6: No), the control part 101 determines whether or not a content transmission request is received via the network 8 and the communication part 111 (step S8). When the control part 101 determines that the content transmission request is received in this processing (step S8: Yes), the control part 101 executes content transmission processing (step S9). In the content transmission processing, content information corresponding to the content transmission request is taken out from the storage part 102, and the content information is transmitted to another terminal apparatus 1 which has made a content transmission request via the communication part 111 and the network 8. In this manner, the control part 101 functions as a content transmission unit which transmits content information stored in the storage part 102 which constitutes the content storage unit via the communication part 111 and the network 8 in response to a request from another terminal apparatus 1.

When the control part 101 determines that the content transmission request is not received in step S8 (step S8: No), or processing in step S3, S5, S7 or S9 is finished, the control part 101 determines whether or not a finish instruction is detected (step S10). For example, when a power source of its own terminal apparatus 1 is shifted to an OFF state, the control part 101 detects the finish instruction.

When the control part 101 determines that the finish instruction is detected in step S10 (step S10: Yes), the control part 101 finishes the main processing. On the other hand, when the control part 101 determines that the finish instruction is not yet detected (step S10: No), the control part 101 repeats processing starting from step S2.

(Content Acquisition Processing)

Next, the content acquisition processing in step S5 is specifically explained in conjunction with a flowchart shown in FIG. 13.

As shown in FIG. 13, when the content acquisition processing starts, the control part 101 determines whether or not the content information on which the acquisition instruction is made is new content information before disclosure (step S20). The determination whether or not the content information on which the acquisition instruction is made is the new content information is executed based on a comparison of disclosure starting time and date of the content information contained in a content catalog and present time and date. That is, when the disclosure starting time and date of the content information to be acquired are time and date after the present time and date measured by the time measuring part 103, the control part 101 determines that the content information on which the acquisition instruction is made is the new content information before disclosure.

When the control part 101 determines that the content information on which the acquisition instruction is made is the new content information before disclosure in this processing (step S20: Yes), the control part 101 determines whether or not the disclosure starting time and date of the new content information on which the acquisition instruction is made arrive (step S21). The determination whether or not the disclosure starting time and date arrive is executed based on the comparison between the disclosure starting time and date of the content information contained in the content catalog and the present time and date. That is, the control part 101 determines that the disclosure starting time and date of the new content information arrive when the present time and date measured by the time measuring part 103 becomes the disclosure starting time and date of the new content information. In this manner, the control part 101 functions as a content acquisition unit which starts the acquisition processing of the content information from a point of time that the acquisition of the content information can be executed.

When the control part 101 determines that the disclosure starting time and date of the new content information arrive in this processing (step S21: Yes), the control part 101 advances to step S23 and executes the content information acquisition permission determination processing. The content information acquisition permission determination processing is constituted of a series of processing executed in steps S30 to S36 shown in FIG. 14, and the content information acquisition permission determination processing is explained in detail later.

When the control part 101 determines that the content information on which the acquisition instruction is made is not the new content information before disclosure in step S20 (step S20: No), the control part 101 determines whether or not the content information on which the acquisition instruction is made is the new content information immediately after the disclosure (step S22). The determination whether or not the content information on which the acquisition instruction is made is the new content information immediately after the disclosure is executed based on a comparison between the disclosure starting time and date of the new content information contained in the content catalog and the present time and date. That is, the control part 101 determines that the content information on which the acquisition instruction is made is the new content information immediately after the disclosure when the disclosure starting time and date of the content information on which the acquisition instruction is made is earlier than the present time and date measured by the time measuring part 103 by a predetermined period.

When the control part 101 determines that the content information on which the acquisition instruction is made is the new content information immediately after the disclosure in this processing (step S22: Yes), the control part 101 advances to step S23 and executes the content information acquisition permission determination processing.

When the content information acquisition permission determination processing in step S23 is finished, the control part 101 transmits a content retrieval message to the route terminal apparatus of the content information on which the acquisition instruction is made (step S24). That is, the control part 101 refers to the content catalog, and takes out the content ID of the content information on which the acquisition instruction is made from the content catalog. Then, based on the routing table stored in the storage part 102, the control part 101 transmits the retrieval message using the content ID as the destination identification information to another terminal apparatus 1 via the communication part 111 and the network 8.

Thereafter, the control part 101 acquires the location information on the content holding terminal apparatus from the route terminal apparatus within a predetermined period (step S25). That is, the control part 101 acquires the location information on the content holding terminal apparatus having the content information on which the acquisition instruction is made from the route terminal apparatus via the network 8 and the communication part 111.

Next, the control part 101 makes a transmission request for the content information to the content holding terminal apparatus whose location information is acquired in this manner via the network 8 and the communication part 111. Thereafter, the control part 101 acquires the content information transmitted from the content holding terminal apparatus in response to such a request via the network 8 and the communication part 111, stores the content information in the storage part 102 which constitutes the content storage unit (step S26), and finishes the content acquisition processing. In this manner, the control part 101 functions as the content acquisition unit which acquires the content information from another terminal apparatus 1 via the network 8.

Figure 14:
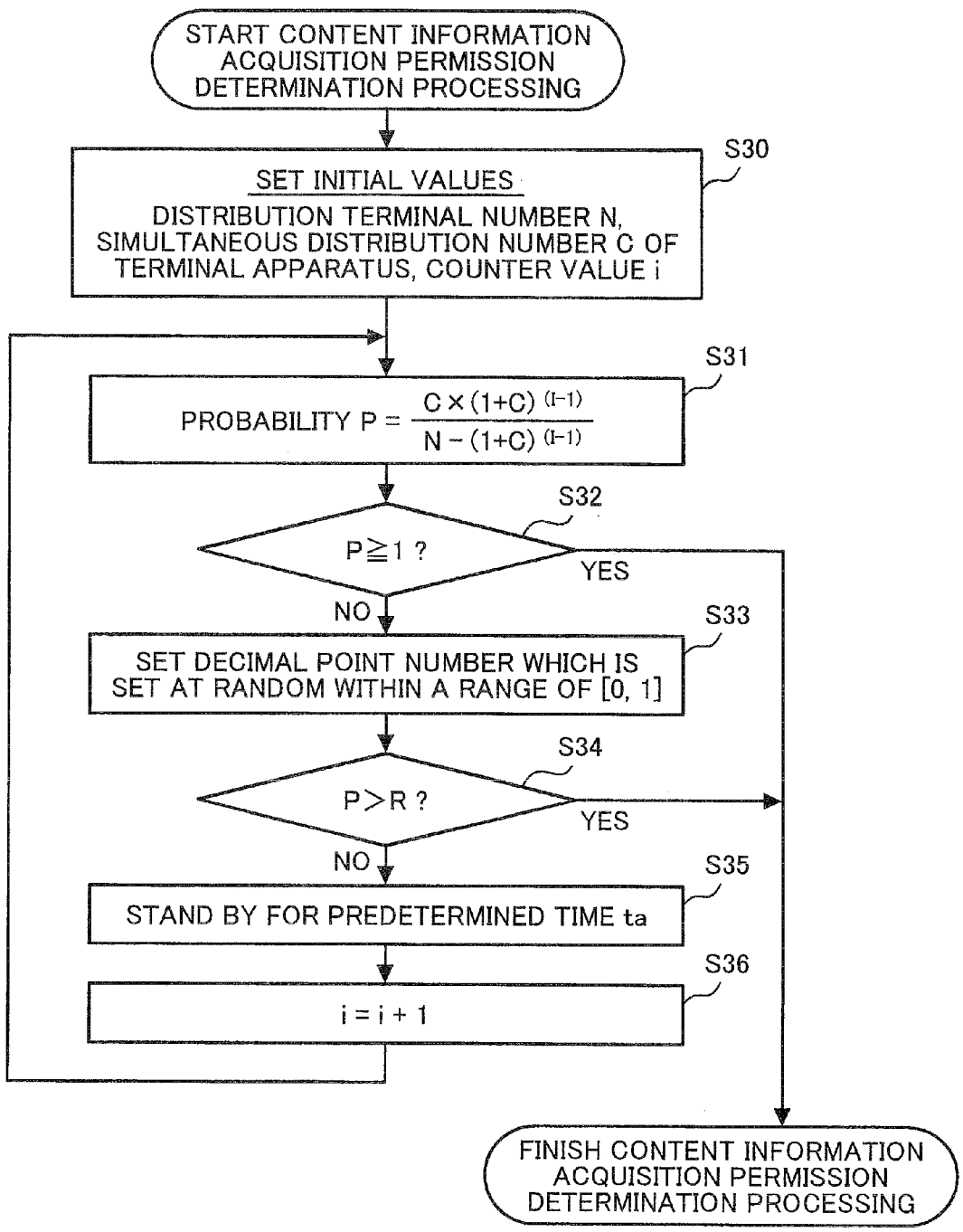
FIG. 14 is a flowchart of content information acquisition procession determination processing with respect to the terminal apparatus shown in FIG. 11.

Here, the content information acquisition permission determination processing executed in step S23 is explained in conjunction with a flowchart shown in FIG. 14.

As shown in FIG. 14, when the content information acquisition permission determination processing starts, the control part 101 sets initial values (step S30). With respect to the initial values which the control part 101 sets, the distribution terminal number N of new content information on which the acquisition instruction is made, the simultaneous distribution number C which is the number of other terminal apparatuses 1 to which the terminal apparatus 1 can distribute the same content information simultaneously, the counter value i and the like are considered. The control part 101 executes setting of the initial values by storing the distribution terminal number N, the simultaneous distribution number C, the counter value i and the like in an initial value storage region (not shown in the drawing) of the storage part 102.

Here, in the center server 10, the distribution terminal number N is contained in the content catalog in a state that a value which is preliminarily set as the distribution terminal number N corresponding to an estimated degree of popularity of the content information (hereinafter referred to as "set distribution terminal number") is associated with the content information. The control part 101 reads out the set distribution terminal number from the content catalog, and stores the distribution terminal number N in an initial value storage region of the storage part 102. In the same manner, in the center server 10, information on the simultaneous distribution number C is contained in the content catalog in a state that this information is associated with the content information, and the control part 101 reads out information on the simultaneous distribution numbers C from the content catalog, and stores the information in the initial value storage region of the storage part 102.

The control part 101 may be configured to acquire the information on the distribution terminal number N from the center server 10. For example, when the acquisition instruction is made with respect to the content information before disclosure, the control part 101 transmits the notification (reservation notification) indicative of such an acquisition instruction to the center server 10 via the communication part 111 and the network 8. Then, when the content information acquisition permission determination processing starts, the control part 101 acquires the number of terminal apparatuses which has made the reservation notification from the center server 10 via the communication part 111 and the network 8, and sets the number of the terminal apparatuses as the distribution terminal number N. In this manner, the control part 101 functions as an acquisition timing information acquisition unit which acquires information on acquisition startable timing of the content information from the center server 10 or the like using the content catalog.

Further, with respect to the content information which is determined to be not yet disclosed in step S30, the counter value i is set to "0". Further, with respect to the content information which is determined to be immediately after the disclosure in step S31, the counter value i is set corresponding to a lapsed time t from a point of time that the disclosure starts. That is, a value which is calculated by dropping a fractional portion of a value obtained by dividing the lapsed time t with a predetermined time ta is set as the counter value i. For example, time required for transmission/reception of the content information between the terminal apparatuses 1 (transmission/reception required time) is set to the predetermined time ta.

Next, the control part 101 reads out the distribution terminal number N, the simultaneous distribution number C and the counter value i from the storage part 102, and calculates the probability P using a formula (2) which is equal to the above-mentioned formula (1). The probability P is probability which is increased exponentially.

$$\text{Probability } P = (C \times (1+C)^{(i-1)})/(N-(1-C)^{(i-1)}) \qquad (2)$$

Next, the control part 101 determines whether or not the probability P is 1 or more (step S32). When the control part 101 determines that probability P is smaller than 1 in this processing (step S32: No), a decimal point number which may be set at random within a range of [0, 1] is set as a permission determination threshold value R (step S33).

Then, the control part 101 determines whether or not the probability P is larger than the permission determination threshold value R (step S34). That is, the control part 101 determines whether or not the acquisition of content information is permitted. When the control part 101 determines that the probability P is not larger than the permission determination threshold value R in this processing (step S34: No), the control part 101 stands by for the predetermined time ta (step S35), increments the counter value i by 1 (step S36), and returns processing to step S31.

Here, the predetermined time ta may be time necessary for transmission/reception of content information between the terminal apparatuses 1 (transmission/reception required time), for example. In such processing, the counter value i is incremented by 1 for every predetermined time ta and hence, requesters corresponding to the number of the content holding terminal apparatuses can only be generated for every predetermined time ta. Accordingly, it is possible to suppress the number of requests for content information from the requesters to the number of terminal apparatuses 1 to which the content holding terminal apparatuses within the communication system S can distribute and hence, accesses to the content holding terminal apparatuses can be effectively restricted thus suppressing the excessive concentration of traffic.

On the other hand, when the control part 101 determines that the probability P is larger than the permission determination threshold value R in step S34 (step S34: Yes), the control part 101 finishes the content information acquisition permission determination processing. That is, the control part 101 allows the acquisition of the content information. When the probability P is set to probability which is larger than a random permission determination threshold value R, such probability is equal to the probability P and hence, the probability P becomes the permission probability Pa as the result.

In this manner, the control part 101 functions as a control unit which, when the acquisition processing of the content information starts, for every predetermined time ta, executes, for every predetermined time ta, the content information acquisition permission determination processing which increases the permission probability exponentially along with a lapse of time from a point of time that the acquisition processing starts. The control part 101 also functions as a content acquisition unit which acquires the content information from another terminal apparatus 1 as shown in steps S24 to S26 when the acquisition of content information is permitted as a result of the content information acquisition determination processing. The control part 101 may execute the content information acquisition permission determination processing which executes permission of the acquisition of the control information with the permission probability shown in FIG. 9 or FIG. 10 where the probability is increased along with a lapse of time.

(DHT Message Processing)

Figure 15:
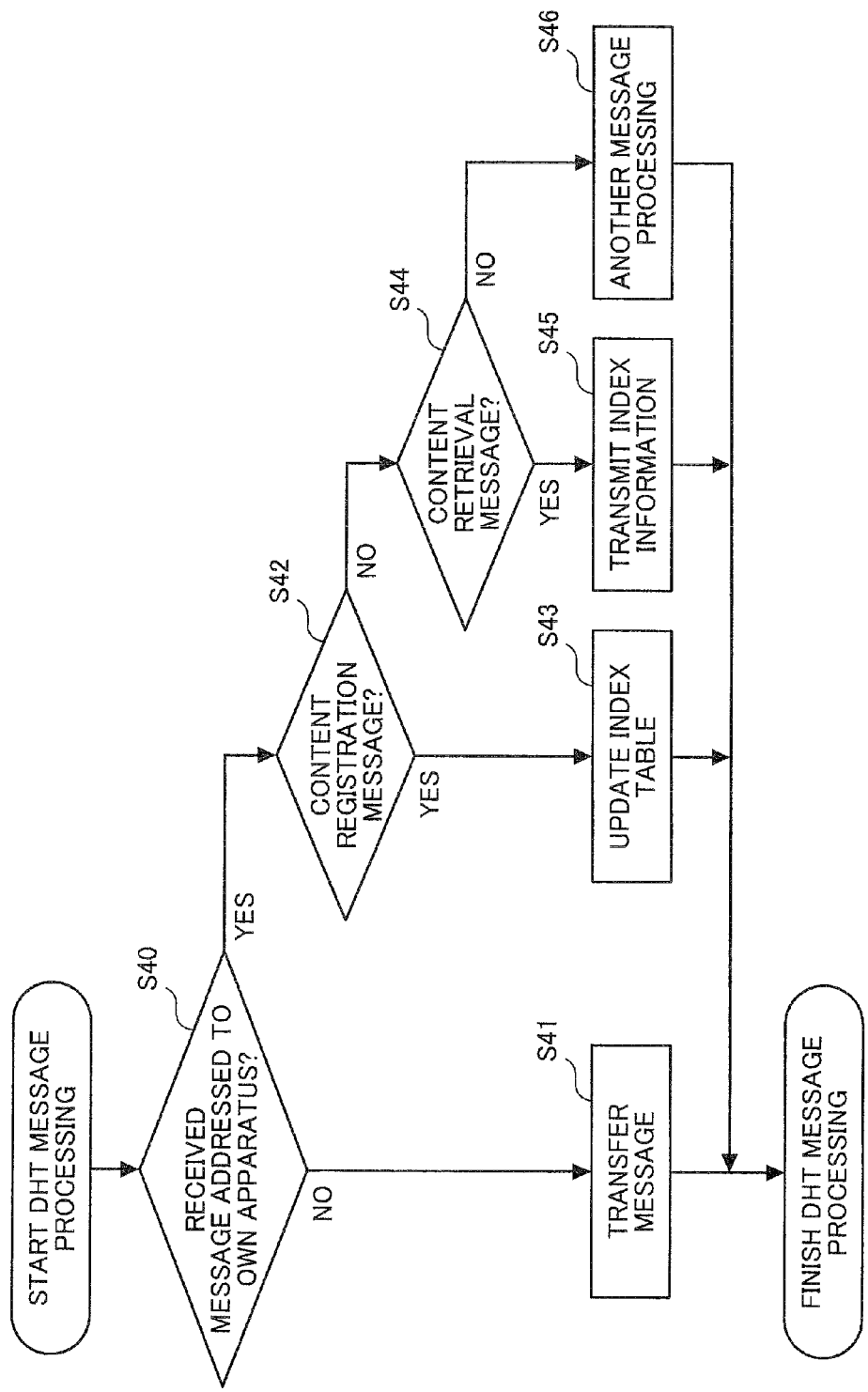
FIG. 15 is a flowchart of DHT message processing with respect to the terminal apparatus shown in FIG. 11.

Next, the DHT message processing in step S7 is specifically explained in conjunction with a flowchart shown in FIG. 15.

As shown in FIG. 15, when the DHT message processing starts, the control part 101 determines whether or not the received message is addressed to its own apparatus (step S40). The determination whether or not the received message is addressed to its own apparatus is made based on whether or not the terminal ID of its own apparatus is closer to the destination identification information on the message. Here, the term "closer to" implies that the terminal ID of its own apparatus does not exceed the destination identification information on the DHT message and the difference between the destination identification information and the terminal ID is the smallest, for example. However, provided that such a relationship between the destination identification information and the terminal ID is consistent, other definition may be adopted for defining "closer to".

When the control part 101 determines that the received message is not addressed to its own apparatus in step S40 (step S40: No), the control part 101 transfers the message by DHT routing based on the routing table stored in the storage part 102 (step S41). On the other hand, when the control part 101 determines that the received message is addressed to its own apparatus in step S40 (step S40: Yes), the control part 101 determines whether or not the message is a content registration message (step S42).

When the control part 101 determines that the received message is the content registration message in step S42 (step S42: Yes), the control part 101 updates an index table by adding index information contained in the content registration message (location information on the content holding terminal apparatus) to the index table stored in the storage part 102 (see FIG. 6, for example) (step S43). On the other hand, when the control part 101 determines that the received message is not the content registration message (step S42: No), the control part 101 determines whether or not the message is a content retrieval message (step S44).

When the control part 101 determines that the received message is the content retrieval message in step S44 (step S44: Yes), the control part 101 takes out the index information requested in the content retrieval message from the index table stored in the storage part 102 (see FIG. 6, for example), and transmits the index information to the terminal apparatus 1 which constitutes a request source (step S45). On the other hand, when the control part 101 determines that the received message is not the content retrieval message (step S44: No), the control part 101 executes processing corresponding to the message (step S46).

When the processing in step S41, S43, S45 or S46 is finished, the control part 101 finishes the DHT message processing.

In the terminal apparatus 1 of the communication system S of this embodiment described above, when the disclosure starting timing of the new content information comes, the calculation in which the probability of acquisition permission of content information is increased along with a lapse of time is performed for every predetermined period.

Accordingly, while increasing the number of the content holding terminal apparatuses within the communication system S, it is possible to allow the requesters number of which corresponds to the increased number of the content holding terminal apparatuses to request the content holding terminal apparatuses to transmit the content information.

As a result, the accesses to the content holding terminal apparatuses can be effectively restricted thus suppressing the excessive concentration of the traffic.

Even when all data of the content information requested by another terminal apparatus 1 is not stored in the storage part 102 which constitutes the content storage unit, the control part 101 may function as a content transmission unit which sequentially transmits data starting from data stored in the storage part 102 out of the content information via the communication part 111 and the network 8.

In such processing, the predetermined time to is set shorter than the time necessary for transmission/reception of the content information between the terminal apparatuses 1 (transmission/reception required time) and, at the same time, the root terminal apparatus is allowed to transmit the location information to the requesters while assigning priority to the location information on the terminal apparatuses which newly become the content holding terminal apparatuses. Due to such an operation, it is possible to efficiently distribute the transmission request for new content information made by the requesters.

Further, although the above-mentioned embodiment has been explained with respect to the case in which the location information of the terminal apparatus 1 is the IP address, the location information may be any information from which the location of the terminal apparatus 1 on the network 8 can be searched (can be accessed by other terminal apparatuses 1 via the network 8) so that the location information may be constituted of the IP address and the port number, for example.

Although several embodiments of the present invention have been explained in detail in conjunction with the drawings heretofore, these embodiments merely constitute examples, and the present invention can be carried out in other modes to which various modifications and improvement are applied based on knowledge of those skilled in the art.

What is claimed is:

1. A terminal apparatus in a communication system including a plurality of terminal apparatuses and being configured to perform transmission and reception of content information between the terminal apparatuses via a network, the terminal apparatus comprising:
   at least one processor; and
   at least one memory, the memory storing an information processing program that when executed causes the at least one processor and at least one memory to function as:
      a content acquisition unit which is configured to acquire content information from another apparatus via the network;
      a content storage unit which is configured to store the content information acquired by the content acquisition unit;
      a content transmission unit which is configured to transmit the content information stored in the content storage unit to another terminal apparatus capable of transmitting/receiving the content information in response to a request from said another terminal apparatus via the network; and
      a control unit which is configured to, when acquisition processing of the content information starts, execute acquisition permission determination processing of the content information to determine an availability number, based on a time counter, the number of terminal apparatuses requesting the content information and the number of terminal apparatuses capable of transmitting the content information, which permits the acquisition of the content information, wherein
         if the availability number is less than a predetermined number, the control unit increments the time counter by a predetermined period and continues the acquisition permission determination processing, the availability number being increased along with a lapse of time from starting of the acquisition processing of the content information for every predetermined period, and
         if the availability number is equal to or greater than the predetermined number, the control unit allows the acquisition of the content information, and
      the content acquisition unit is configured to, when the control unit allows the acquisition of the content information based on the determined availability number, acquire the content information from another terminal apparatus capable of transmitting/receiving the content information.

2. A terminal apparatus according to claim 1, wherein the content acquisition unit starts the acquisition processing of the content information when the content information stored in one or more terminal apparatuses within the communication system is acquirable from another terminal apparatus.

3. A terminal apparatus according to claim 1, wherein the terminal apparatus further includes an acquisition timing information acquisition unit which acquires information on a content-information acquisition starting possible timing, and the content acquisition unit is configured to start the acquisition processing of the content information from the acquisition starting possible timing.

4. A terminal apparatus according to claim 1, wherein the availability number of the acquisition permission determination processing is set to a number which is increased exponentially along with a lapse of time from starting of the acquisition processing of the content information.

5. A terminal apparatus according to claim 1, wherein the availability number of the acquisition permission determination processing is set to a number which is increased in proportion to a lapse of time from starting of the acquisition processing of the content information.

6. A terminal apparatus according to claim 1, wherein even when all data of the content information requested by another terminal apparatus is not stored in the content storage unit, the content transmission unit is configured to sequentially transmit data starting from data stored in the content storage unit out of the content information via the network.

7. A communication system including a plurality of terminal apparatuses and being configured to perform transmission and reception of content information between the terminal apparatuses via a network, wherein each said terminal apparatus comprises:
   at least one processor; and
   at least one memory, the memory storing an information processing program that when executed causes the at least one processor and at least one memory to function as:
      a content acquisition unit which is configured to acquire content information from another apparatus via the network;
      a content storage unit which is configured to store the content information acquired by the content acquisition unit,
      a content transmission unit which is configured to transmit the content information stored in the content storage unit to another terminal apparatus capable of transmitting/receiving the content information in response to a request from said another terminal apparatus via the network; and
      a control unit which is configured to, when acquisition processing of the content information starts, execute acquisition permission determination processing of the content information to determine an availability number, based on the time counter, the number of terminal apparatuses requesting the content information and the number of terminal apparatuses capable of transmitting the content information, which permits the acquisition of the content information, wherein
         if the availability number is less than a predetermined number, the control unit increments a time counter by a predetermined period and continues the acquisition permission determination processing, the availability number being increased along with a lapse of time from starting of the acquisition processing of the content information for every predetermined period, and
         if the availability number is equal to or greater than the predetermined number, the control unit allows the acquisition of the content information, and the content acquisition unit is configured to, when the control unit allows the acquisition of the content information based on the determined availability number, acquire the content information from another terminal apparatus capable of transmitting/receiving the content information.

8. A method of acquiring content information on a terminal apparatus in a communication system including a plurality of terminal apparatus and being configured to perform transmission and reception of content information between the terminal apparatuses via a network, the method comprising the steps of:

acquiring content information from another apparatus via the network;

storing the content information acquired by the content acquisition unit in a content storing unit; and transmitting the content information stored in the content storage unit to another terminal apparatus capable of transmitting/receiving the content information in response to a request from said another terminal apparatus via the network; and executing acquisition permission determination processing of the content information to determine an availability number, based on a time counter, the number of terminal apparatuses requesting the content information and the number of terminal apparatuses capable of transmitting the content information, which permits the acquisition of the content information, wherein if the availability number is less than a predetermined number, incrementing the time counter by a predetermined period and continuing the acquisition permission determination processing, the availability number being increased along with a lapse of time from starting of the acquisition processing of the content information for every predetermined period when acquisition processing of the content information starts, and if the availability number is equal to or greater than the predetermined number, allowing the acquisition of the content information, and in the step of acquiring content information from another apparatus via the network, when a result of the acquisition permission determination processing allows the acquisition of the content information based on the availability number, the content information is acquired from another terminal apparatus capable of transmitting/receiving the content information.

9. A non-transitory computer readable recording medium recording a program to make a computer function as a terminal apparatus in a communication system including a plurality of terminal apparatus and being configured to perform transmission and reception of content information between the terminal apparatuses via a network, the storage medium storing computer instructions for configuring the computer to perform the steps of:

acquiring content information from another apparatus via the network;

storing the content information acquired by the content acquisition unit in a content storing unit; and transmitting the content information stored in the content storage unit to another terminal apparatus capable of transmitting/receiving the content information in response to a request from said another terminal apparatus via the network; and executing acquisition permission determination processing of the content information to determine an availability number, based on a time counter, the number of terminal apparatuses requesting the content information and the number of terminal apparatuses capable of transmitting the content information, which permits the acquisition of the content information, wherein if the availability number is less than a predetermined number, incrementing the time counter by a predetermined period and continuing with the acquisition permission determination processing, the availability number being increased along with a lapse of time from starting of the acquisition processing of the content information for every predetermined period when acquisition processing of the content information starts, and if the availability number is equal to or greater than the predetermined number, allowing the acquisition of the content information, and in the step of acquiring content information from another apparatus via the network, when a result of the acquisition permission determination processing allows the acquisition of the content information based on the availability number, the content information is acquired from another terminal apparatus capable of transmitting/receiving the content information.

10. A terminal apparatus according to claim 1, wherein among the plurality of terminal apparatuses, a number of terminal apparatuses containing the content information is increased along with the lapse of time from starting of the acquisition processing of the content information for every predetermined period.

11. A terminal apparatus according to claim 10, wherein the content acquisition unit acquires the content information from any one of the number of terminal apparatuses containing the predetermined content data.

12. A terminal apparatus according to claim 1, wherein the content acquisition unit determines the terminal apparatus capable of transmitting the content information by receiving an IP address of the terminal apparatus capable of transmitting the content information from a route terminal apparatus which administers the content information.

13. A terminal apparatus according to claim 1, wherein the availability number is calculated according to the following formula:

$$Pa=(C(1+C)^{(i-1)})/(N-(1+C)^{i-1})$$

where "Pa" indicates the availability number, "C" indicates a number of other terminal apparatuses to which the same content information can be transmitted simultaneously from a single terminal apparatus, "i" indicates a counter which is incremented along with the lapse of time, and "N" indicates a number of terminal apparatuses attempting to acquire the content information, wherein if Pa is less than 1, the control unit increments the counter for the predetermined period and continues with the acquisition permission determination processing, the availability number being increased for every predetermined period, and if Pa is equal to or greater than 1, the control unit finishes the acquisition permission determination processing.

* * * * *